(12) United States Patent
Hurley et al.

(10) Patent No.: US 10,559,104 B2
(45) Date of Patent: Feb. 11, 2020

(54) SYSTEM AND METHOD FOR VISUALIZING DATA

(75) Inventors: Peter Hurley, Hollis, NH (US); Andrew Najda, Carlisle, MA (US); Joseph J. Cobau, Melrose, MA (US); Steven C. Fried, Lexington, MA (US)

(73) Assignee: Primena Corporation, Concord, MA (US)

( * ) Notice: Subject to any disclaimer, the term of this patent is extended or adjusted under 35 U.S.C. 154(b) by 91 days.

(21) Appl. No.: 11/800,651

(22) Filed: May 7, 2007

(65) Prior Publication Data

US 2018/0204359 A1    Jul. 19, 2018

Related U.S. Application Data

(63) Continuation of application No. 10/411,499, filed on Apr. 10, 2003, now Pat. No. 7,250,951.

(60) Provisional application No. 60/371,466, filed on Apr. 10, 2002.

(51) Int. Cl.
| | | |
|---|---|---|
| *G06T 11/20* | (2006.01) | |
| *G06T 11/40* | (2006.01) | |
| *G06T 15/00* | (2011.01) | |
| *G06F 3/048* | (2013.01) | |

(52) U.S. Cl.
CPC .................................. *G06T 11/206* (2013.01)

(58) Field of Classification Search
CPC combination set(s) only.
See application file for complete search history.

(56) References Cited

U.S. PATENT DOCUMENTS

| | | | |
|---|---|---|---|
| 5,461,708 A * | 10/1995 | Kahn ..................... | G06F 17/246 345/440 |
| 5,555,354 A * | 9/1996 | Strasnick ............ | G06F 3/04815 345/427 |
| 5,555,366 A | 9/1996 | Teig et al. | |
| D389,133 S | 1/1998 | Wimmer et al. | |
| (Continued) | | | |

OTHER PUBLICATIONS

Abram et al., "An Extended Data-Flow Architecture for Data Analysis and Visualization," 1995, pp. 263-270.
(Continued)

*Primary Examiner* — Wesner Sajous
(74) *Attorney, Agent, or Firm* — Greenberg Traurig LLP

(57) ABSTRACT

The present invention comprises an improved system and method for visualizing data. In a preferred form of the invention, there is provided an improved system and method for comprehending and communicating time course or sequential numerical data, and their complex interdependencies, through the use of a novel three dimensional orthogonal chart system. In another preferred form of the invention, there is provided a three dimensional orthogonal chart system for visualizing data comprising of a plurality of data sets, wherein each of the data sets is represented as a separate ribbon propagating along the first axis. In another preferred form of the invention, there is provided a three dimensional orthogonal chart system for visualizing data comprising of a plurality of data sets, wherein each of the data sets is represented as a separate ribbon propagating along a first axis, with the separate ribbons being displaced from one another along another axis.

21 Claims, 8 Drawing Sheets
(8 of 8 Drawing Sheet(s) Filed in Color)

(56) References Cited

U.S. PATENT DOCUMENTS

| | | | |
|---|---|---|---|
| 5,751,931 A | 5/1998 | Cox et al. | |
| 5,848,425 A * | 12/1998 | Lowry | G06F 17/246 |
| | | | 715/205 |
| 5,917,500 A | 6/1999 | Johnson et al. | |
| 5,995,214 A * | 11/1999 | Bruckstein | G01B 11/26 |
| | | | 340/955 |
| D418,495 S | 1/2000 | Brockel et al. | |
| D420,340 S | 2/2000 | Bailer et al. | |
| D425,521 S | 5/2000 | Hedberg | |
| 6,166,740 A | 12/2000 | Malzbender | |
| 6,188,403 B1 | 2/2001 | Sacerdoti et al. | |
| 6,222,540 B1 | 4/2001 | Sacerdoti | |
| D441,761 S | 5/2001 | Machida et al. | |
| 6,366,284 B1 | 4/2002 | McDonald | |
| 6,429,868 B1 * | 8/2002 | Dehner, Jr. | G06T 11/206 |
| | | | 345/440 |
| 6,462,736 B1 * | 10/2002 | Ross | G06Q 10/087 |
| | | | 345/419 |
| 6,466,211 B1 | 10/2002 | Havre et al. | |
| D465,788 S | 11/2002 | Boehler et al. | |
| D467,251 S | 12/2002 | Platz et al. | |
| D472,901 S | 4/2003 | Kovanen et al. | |
| D477,327 S | 7/2003 | Emig et al. | |
| 6,707,454 B1 | 3/2004 | Barg et al. | |
| D490,438 S | 5/2004 | Greminger | |
| 6,750,864 B1 * | 6/2004 | Anwar | G06F 17/30489 |
| | | | 345/440 |
| D496,942 S | 10/2004 | Segal et al. | |
| D498,478 S | 11/2004 | Hurley et al. | |
| 6,995,768 B2 | 2/2006 | Jou et al. | |
| 7,250,951 B1 | 7/2007 | Hurley et al. | |
| 2002/0174293 A1 | 11/2002 | Fox et al. | |
| 2003/0014355 A1 | 1/2003 | Browne et al. | |
| 2003/0137504 A1 * | 7/2003 | Williams | G06T 15/00 |
| | | | 345/419 |
| 2004/0257375 A1 | 12/2004 | Cowperthwaite | |
| 2010/0014874 A1 * | 1/2010 | Kawanishi | G02F 1/225 |
| | | | 398/187 |

OTHER PUBLICATIONS

Card et al., "Information Visualization," Morgan Kaufmann Publishers, 1999, pp. 16-34 and 97-102.

* cited by examiner

SYSTEM AND METHOD FOR VISUALIZING DATA

REFERENCE TO PENDING PRIOR PATENT APPLICATIONS

This patent application is a continuation of prior U.S. patent application Ser. No. 10/411,499, filed Apr. 10, 2003 now U.S. Pat. No. 7,250,951 by Peter Hurley et al. for SYSTEM AND METHOD FOR VISUALIZING DATA, which in turn claims benefit of U.S. Provisional Patent Application Ser. No. 60/371,466, filed Apr. 10, 2002 by Peter Hurley et al. for XD IMAGINE XD.

The above-identified patent applications are hereby incorporated herein by reference.

FIELD OF THE INVENTION

This invention relates to data visualization in general, and more particularly to systems and methods for visualizing data, and even more particularly to systems and methods for visualizing financial data.

BACKGROUND OF THE INVENTION

A large number of investors are now trading in the securities markets. According to Business Week™, there are currently about 100 million individual investors in the United States alone. These individuals invest in the securities markets either on their own as individual traders or through a variety of brokers. According to The Tower Group™, there are currently about 675,000 registered brokers in the United States alone. These brokers work at about 5,500 different firms which staff almost 90,000 branch offices throughout the United States.

An enormous amount of financial information is now available to professional and individual investors, and the volume and availability of this information is growing at an explosive rate. By way of example, note the recent explosion of online financial information. Price quotes for almost any financial instrument (e.g., stocks, bonds, etc.) are now readily available from a wide variety of online sites. Furthermore, Morningstar™ now offers its mutual fund ratings online, and Yahoo™ allows an investor to review SEC filings, look at analysts' stock recommendations, and learn how other markets around the world are performing. At the same time, traditional print publications such as The Wall Street Journal™ and The Financial Times™ are making more and more financial information available to the reader, and traditional broadcast media such as television and cable television are now providing 24-hour business programming.

The widespread availability of this enormous volume of often conflicting and confusing information often inhibits the ability of investors to comprehend and utilize the information efficiently. As a result, their confidence in what that information means frequently decreases almost in proportion to the rate at which the quantity of information grows. The sheer quantity of data obscures the correlation and interdependencies inherent in that data. For individual investors, the volume of data can be daunting. Even experienced traders, looking at dynamically changing assortments of numbers, tables, charts and graphs, are sometimes overwhelmed. This often leads to increased stress, eye fatigue and frustration. Under these conditions, even seasoned professionals sometimes fail to make critical decisions well and frequently resort to the oldest—and possibly the most unreliable—criteria of all, the "gut instinct".

Thus there is a significant need for a more effective tool for mining the wealth of financial data currently available, extracting significant information therefrom, and presenting the same to the investor in a visually compelling manner.

SUMMARY OF THE INVENTION

The present invention comprises an improved system and method for visualizing data. In a preferred form of the invention, there is provided an improved system and method for comprehending and communicating financial data, and their complex interdependencies, through the use of a novel three dimensional orthogonal chart system.

In one preferred form of the invention, there is provided a three dimensional orthogonal chart system for visualizing data comprising at least two data sets, wherein one data set is represented as a ribbon propagating along a first axis and the second data set is represented as a curtain propagating along the first axis.

In another preferred form of the invention, there is provided a three dimensional orthogonal chart system for visualizing data comprising at least three data sets, wherein one data set is represented as a ribbon propagating along a first axis, the second data set is represented as a curtain propagating along the first axis, and the third data set is represented as a back plane propagating along the first axis.

In another preferred form of the invention, there is provided a three dimensional orthogonal chart system for visualizing data comprising at least three data sets, wherein one data set is represented as a ribbon propagating along a first axis, the second data set is represented as a first curtain propagating along the first axis, and the third data set is represented as a stacked curtain propagating along the first axis.

In another preferred form of the invention, there is provided a three dimensional orthogonal chart system for visualizing data comprising at least four data sets, wherein one data set is represented as a ribbon propagating along a first axis, the second and third data sets are represented as first and second stacked curtains propagating along the first axis, and the fourth data set is represented as a back plane propagating along the first axis, wherein the fourth data set may comprise a composite of the second and third data sets.

In another preferred form of the invention, there is provided a three dimensional orthogonal chart system for visualizing data comprising a plurality of data sets, wherein each of the data sets is represented as a separate ribbon propagating along a first axis, with the separate ribbons being displaced from one another along another axis.

In another preferred form of the invention, there is provided a three dimensional orthogonal chart system for visualizing data comprising a plurality of data sets, wherein each of the data sets is represented as a separate ribbon propagating along a first axis, with the separate ribbons being displaced from one another along another axis, and further wherein a moving cursor plane is configured for movement along the first axis.

In another preferred form of the invention, there is provided a three dimensional orthogonal chart system for visualizing data comprising a plurality of data sets, wherein each of the data sets is represented as a separate ribbon propagating along a first axis, with the separate ribbons being displaced from one another along a second axis, and with the angle of view being an overhead view in an orthographic projection.

In another preferred form of the invention, there is provided a three dimensional orthogonal chart system for visualizing data comprising the pricing, distribution, and trading activity for option contracts, including both calls and puts, with strike price being plotted along the first axis, option price (or some other data set) being plotted along the second axis, and expiration date being plotted along a third axis.

BRIEF DESCRIPTION OF THE DRAWINGS

This Application contains drawings executed in color. Copies of the published Application or issued Patent with color drawings will be provided by the Office upon request and payment of the necessary fee.

Objects and features of the present invention as discussed hereinabove will be more fully disclosed by the following detailed description of the preferred embodiments, which are to be considered together with the accompanying drawings wherein like numbers refer to like parts, and further wherein.

DETAILED DESCRIPTION OF THE PREFERRED EMBODIMENTS

Overview

The present invention provides a unique system and method for visualizing financial information.

More particularly, the present invention provides a unique visualization system for visualizing financial information relating to securities and other financial instruments such as, but not limited to, stocks, bonds, mutual funds, options, futures, indexes, derivatives, currency, Treasuries, money market funds and the like.

The financial information being visualized may be based on raw data obtained from a historical database and/or a live data feed, and/or it may be based on data derived from (e.g., calculated from) a historical database and/or a live data feed.

In order to create the desired visualization for the financial information, the axes of a three dimensional orthogonal coordinate system are first established based on attributes of the data. These attributes may be, but are not limited to, time, price, volume, yield, relative compound growth, relative portfolio value and/or other relevant metrics. The axes may be linear or non-linear, continuous or non-continuous (i.e., discrete), and/or contiguous or non-contiguous, as desired. For example, multiple, discrete date ranges of a single security may be displayed simultaneously within the same visualization. By way of further example but not limitation, an axis may represent a finite, discrete domain, e.g., the strike prices of option contracts.

The data is then plotted into the chart in accordance with the present invention.

First Embodiment

Figure 1:
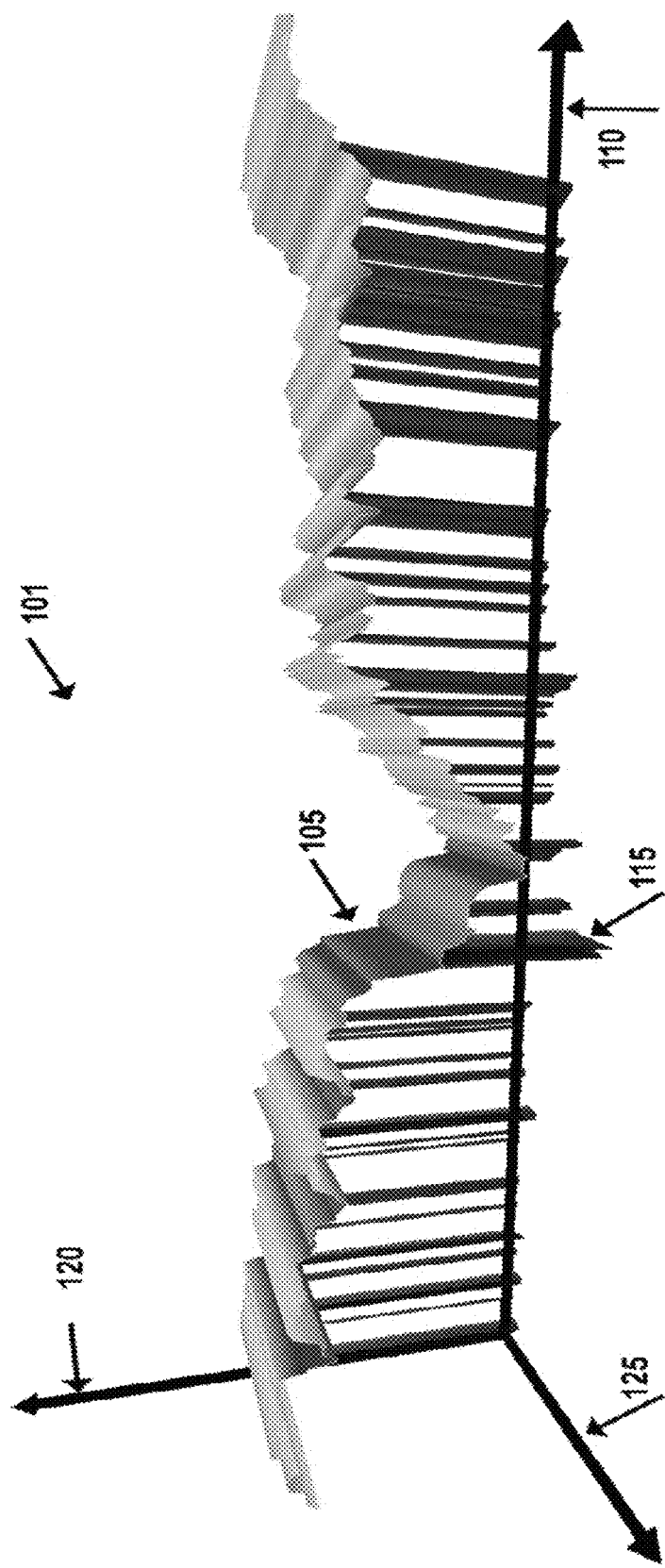
FIG. 1 is a schematic illustration showing a first embodiment of the present invention, wherein there is provided a three dimensional orthogonal chart system for visualizing data comprising at least two data sets, wherein one data set is represented as a ribbon propagating along a first axis and the second data set is represented as a curtain propagating along the first axis.

Looking first at FIG. 1, in one preferred form of the invention, there is provided a three dimensional orthogonal chart system 101 for visualizing data comprising at least two data sets, wherein one data set is represented as a ribbon 105 propagating along a first (i.e., X) axis 110, and the second data set is represented as a curtain 115 propagating along the first axis 110. Preferably ribbon 105 varies in height along a second (i.e., Y) axis 120, while having a substantially fixed width as measured along the third axis (i.e., Z) axis 125.

Preferably curtain 115 has a height along the second (Y) axis 120 which is the same as the height of ribbon 105 at that point along the first (X) axis 110, and a varying displacement along the third (Z) axis 125. Alternatively, curtain 115 may have a height different than the height of ribbon 105, e.g., it may be of a fixed height intersecting ribbon 105. If desired, ribbon 105 and/or curtain 115 can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 101 is utilized to chart stock transactions, with date being represented along the first (X) axis 110, and with price being plotted along the second (Y) axis 120 by ribbon 105 and volume being plotted along the third (Z) axis 125 by curtain 115. With respect to ribbon 105, it may also be shaded according to its variance from norm and its width may be fixed but represent the maximum volume traded. With respect to curtain 115, it may be shaded according to its variance from norm, and its opacity may vary in relation to its variance from norm.

Second Embodiment

Figure 2:
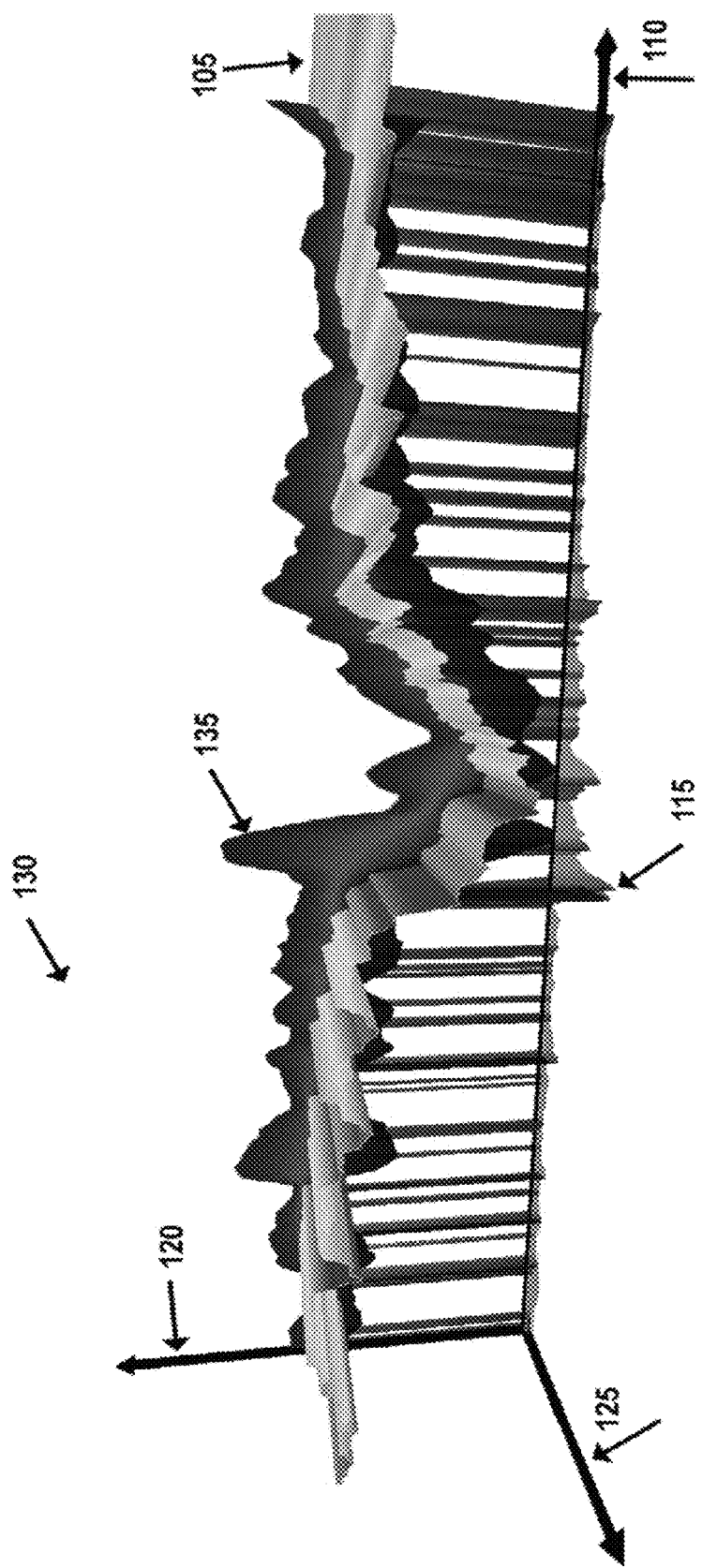
FIG. 2 is a schematic illustration showing a second embodiment of the present invention, wherein there is provided a three dimensional orthogonal chart system for visualizing data comprising at least three data sets, wherein one data set is represented as a ribbon propagating along a first axis, the second data set is represented as a curtain propagating along the first axis, and the third data set is represented as a back plane propagating along the first axis.

Looking next at FIG. 2, in another preferred form of the invention, there is provided a three dimensional orthogonal chart system 130 for visualizing data comprising at least three data sets, wherein one data set is represented as a ribbon 105 propagating along the first (X) axis 110, the second data set is represented as a curtain 115 propagating along the first (X) axis 110, and the third data set is represented as a back plane 135 propagating along the first (X) axis 110. Again, ribbon 105 preferably varies in height along the second (Y) axis 120, while having a substantially fixed width as measured along the third axis (Z) axis 125. Preferably curtain 115 has a height along the second (Y) axis 120 which is the same as the height of ribbon 105 at that point along the first (X) axis 110, and a varying displacement along the third (Z) axis 125. Alternatively, curtain 115 may have a height different than the height of ribbon 105, e.g., it may be of a fixed height intersecting ribbon 105. Preferably back plane 135 varies in height along the second (Y) axis 120. If desired, ribbon 105, curtain 115 and back plane 135 can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 101 is utilized to chart stock transactions, with date being represented along the first (X) axis 110, and with price being plotted along the second (Y) axis 120 by ribbon 105, volume being plotted along the third (Z) axis 125 by curtain 115, and standard deviation (i.e., σ) being plotted along the second (Y) axis 120 by back plane 135. With respect to ribbon 105, it may also be shaded according to its variance from norm and its width may be fixed but represent the maximum volume traded. With respect to curtain 115, it may be shaded according to its variance from norm, and its opacity may vary in relation to its variance from norm.

Third Embodiment

Figure 3:
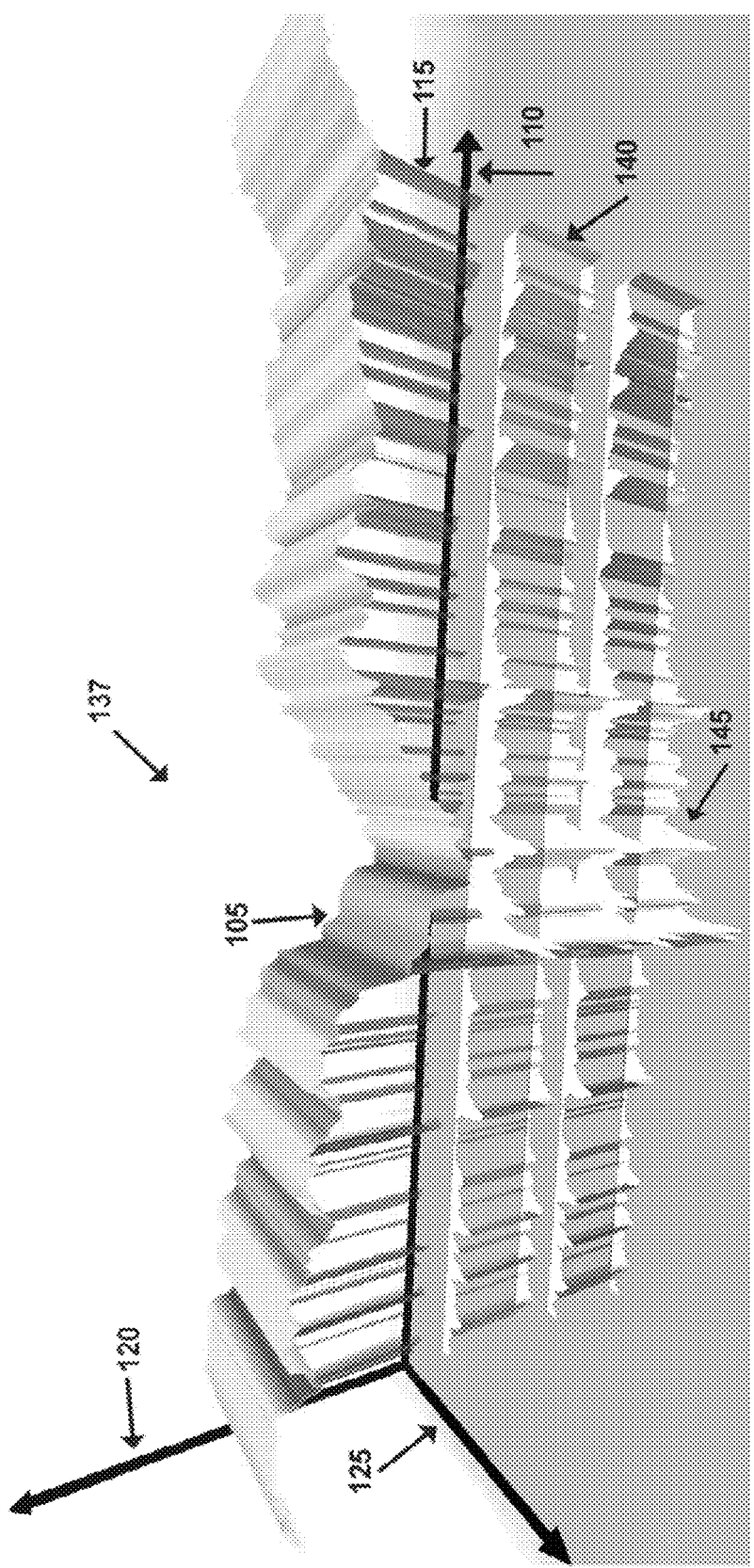
FIG. 3 is a schematic illustration showing a third embodiment of the present invention, wherein there is provided a three dimensional orthogonal chart system for visualizing data comprising at least four data sets, wherein one data set is represented as a ribbon propagating along a first axis, the second data set is represented as a first curtain propagating along the first axis, and the third and fourth data sets are represented as stacked curtains propagating along the first axis.

Looking next at FIG. 3, in another preferred form of the invention, there is provided a three dimensional orthogonal chart system 137 for visualizing data comprising at least four data sets, wherein one data set is represented as a ribbon 105 propagating along the first (X) axis 110, the second data set is represented as a first curtain 115 propagating along the first (X) axis 110, and the third and fourth data sets are represented as stacked curtains 140 and 145, respectively, propagating along the first (X) axis 110. Again, ribbon 105 preferably varies in height along the second (Y) axis 120, while having a substantially fixed width as measured along the third (Z) axis 125. Preferably first curtain 115 has a height along the second (Y) axis 120 which is the same as the height of ribbon 105 at that point along the first (X) axis 110, and a varying displacement along the third (Z) axis 125. Alternatively, curtain 115 may have a height different than the height of ribbon 105, e.g., it may be of a fixed height intersecting ribbon 105. Preferably stacked curtains 140 and 145 have a substantially constant height along the second (Y) axis 120, and a varying displacement along the third (Z) axis 125. If desired, ribbon 105, first curtain 115 and stacked curtains 140 and 145 can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 137 is utilized to chart stock transactions, with date being represented along the first (X) axis 110, and with price being plotted along the second (Y) axis 120 by ribbon 105, volume being plotted along the third (Z) axis 125 by curtain 115, moving average volume being plotted along the third (Z) axis 125 by stacked curtain 140 and stochastic (short term price velocity) being plotted along the third (Z) axis 125 by stacked curtain 145. With respect to ribbon 105, it may also be shaded according to its variance from norm and its width may be fixed but represent the maximum volume traded. With respect to curtain 115, it may be shaded according to its variance from norm, and its opacity may vary in relation to its variance from norm.

Fourth Embodiment

Figure 4:
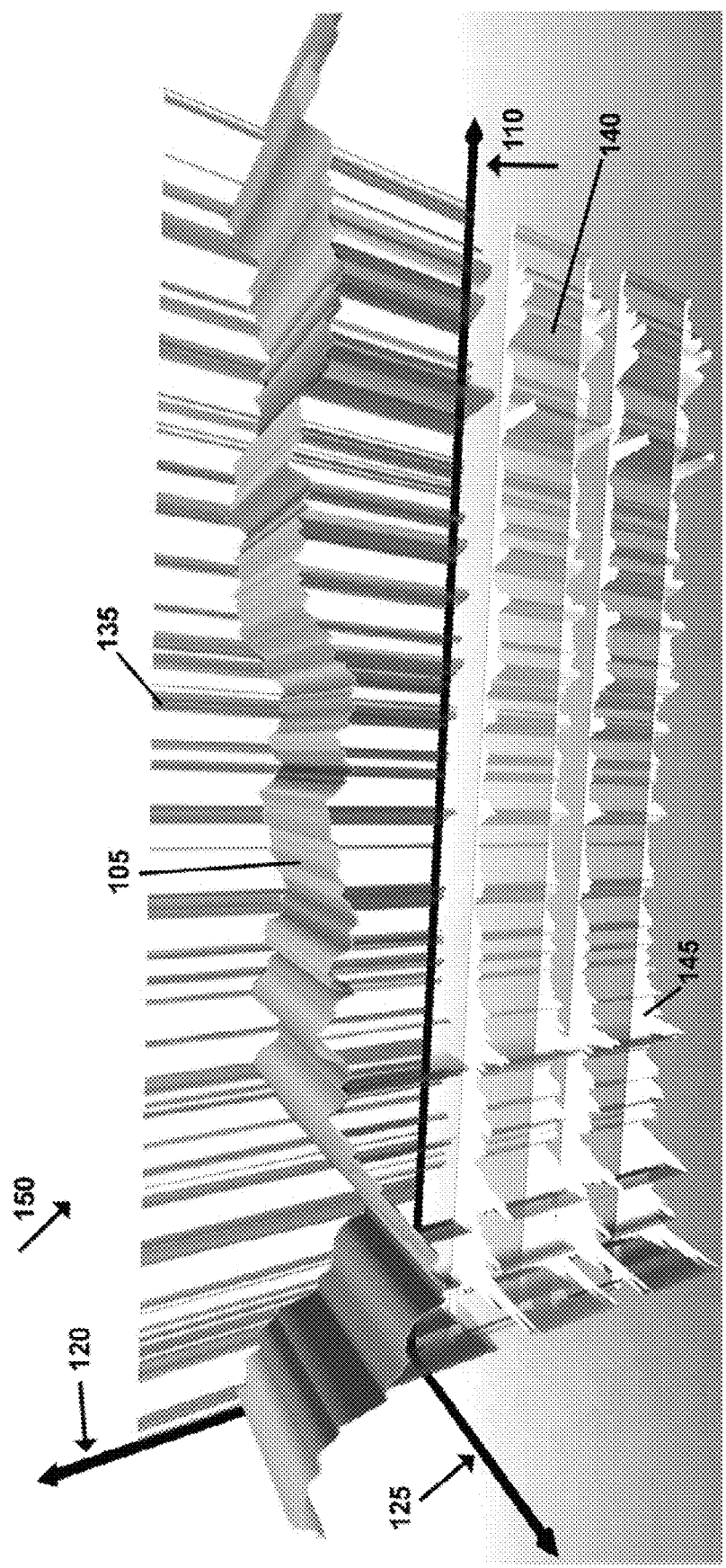
FIG. 4 is a schematic illustration showing a fourth embodiment of the present invention, wherein there is provided a three dimensional orthogonal chart system for visualizing data comprising at least four data sets, wherein one data set is represented as a ribbon propagating along a first axis, the second and third data sets are represented as first and second stacked curtains propagating along the first axis, and the fourth data set is represented as a back plane propagating along the first axis, wherein the fourth data set comprises a composite of the second and third data sets.

Looking next at FIG. 4, in another preferred form of the invention, there is provided a three dimensional orthogonal chart system 150 for visualizing data comprising at least four data sets, wherein one data set is represented as a ribbon 105 propagating along the first (X) axis 110, the second and third data sets are represented as first and second stacked curtains 140 and 145, respectively, propagating along the first (X) axis 110, and the fourth data set is represented as a back plane 135 propagating along the first (X) axis 110, wherein the fourth data set comprises a composite of the second and third data sets. Alternatively, the fourth data set may comprise something other than a composite of the second and third data sets. Again, ribbon 105 preferably varies in height along the second (Y) axis 120, while having a substantially fixed width as measured along the third (Z) axis 125. Preferably stacked curtains 140 and 145 have a substantially constant height along the second (Y) axis 120, and a varying displacement along the third (Z) axis 125. If desired, ribbon 105 and stacked curtains 140 and 145 and back plane 135 can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 150 is utilized to chart stock transactions, with date being represented along the first (X) axis 110, and with price being plotted along the second (Y) axis 120 by ribbon 105, stochastic (short term price velocity) being plotted along the third (Z) axis 125 by stacked curtain 140, volume being plotted along the third (Z) axis 125 by stacked curtain 145, and the composite of the stochastic and volume being plotted along the third (Z) axis 125 by back plane 135. With respect to ribbon 105, it may also be shaded according to its variance from norm and its width may be fixed but represent the maximum volume traded. With respect to stacked curtains 140 and 145, they may be shaded according to their variance from norm, and their opacity may vary in relation to their variance from norm.

Fifth Embodiment

Figure 5:
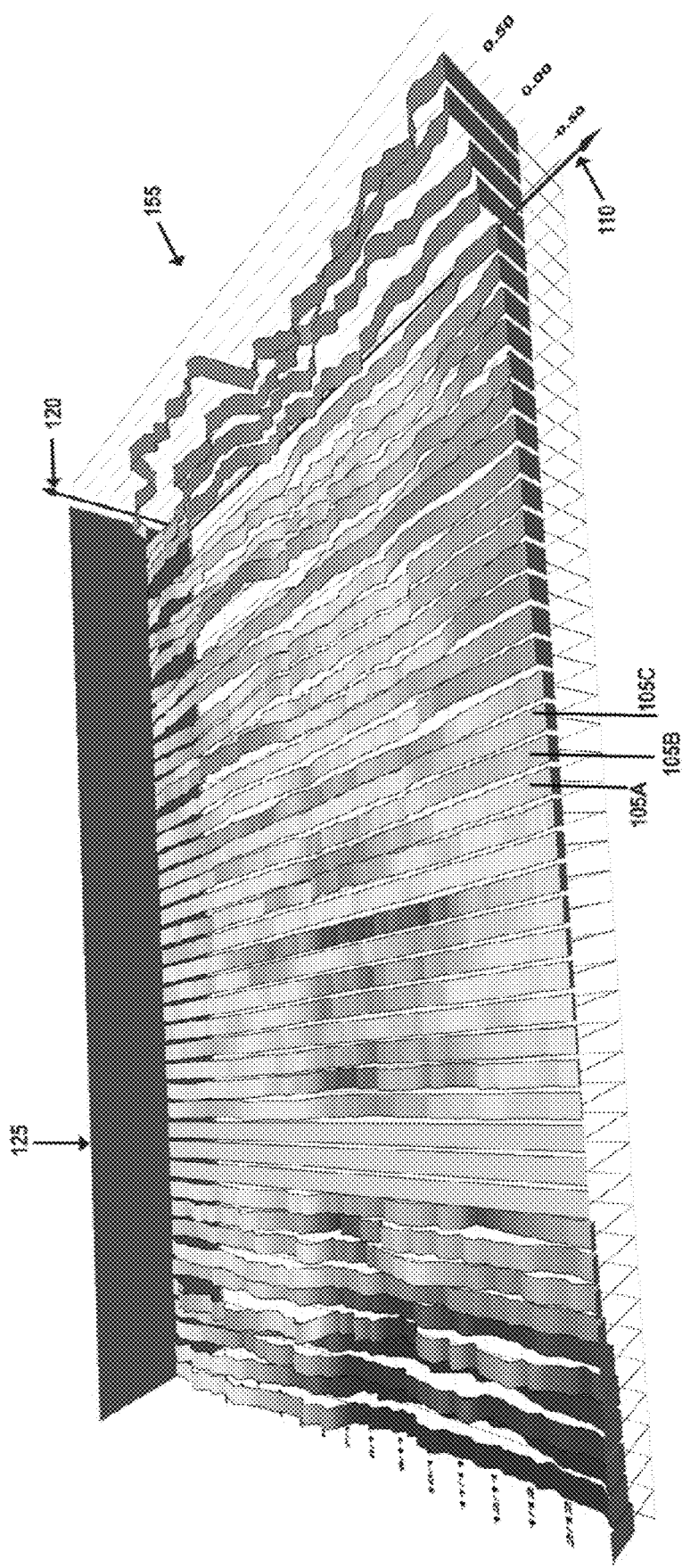
FIG. 5 is a schematic illustration showing a fifth embodiment of the present invention, wherein there is provided a three dimensional orthogonal chart system for visualizing data comprising a plurality of data sets, wherein each of the data sets is represented as a separate ribbon propagating along a first axis, with the separate ribbons being displaced from one another along another axis.

Looking next at FIG. 5, in another preferred form of the invention, there is provided a three dimensional orthogonal chart system 155 for visualizing data comprising a plurality of data sets, wherein each of the data sets is represented as a separate ribbon 105A, 105B, 105C, etc. propagating along the first (X) axis 110, with the separate ribbons 105A, 105B, 105C, etc. being displaced from one another along the third (Z) axis 125. Each ribbon 105A, 105B, 105C, etc. preferably varies in height along the second (Y) axis 120, while having a substantially fixed width as measured along the third (Z) axis 125. If desired, ribbon 105A, 105B, 105C, etc. can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 155 is utilized to chart stock transactions, with date being represented along the first (X) axis 110, and with the performance for one stock being plotted along the second (Y) axis 120 by ribbon 105A, the performance for another stock being plotted along the second (Y) axis 120 by ribbon 105B, the performance for still another stock being plotted along the second (Y) axis 120 by ribbon 105C, etc. By way of example but not limitation, performance can be measured in terms of rate of return, value, relative value, relative value over time, etc. With respect to ribbon 105A, 105B, 105C, etc, it may also be shaded according to its variance from norm and its width may be fixed but represent the maximum volume traded.

Sixth Embodiment

Figure 6:
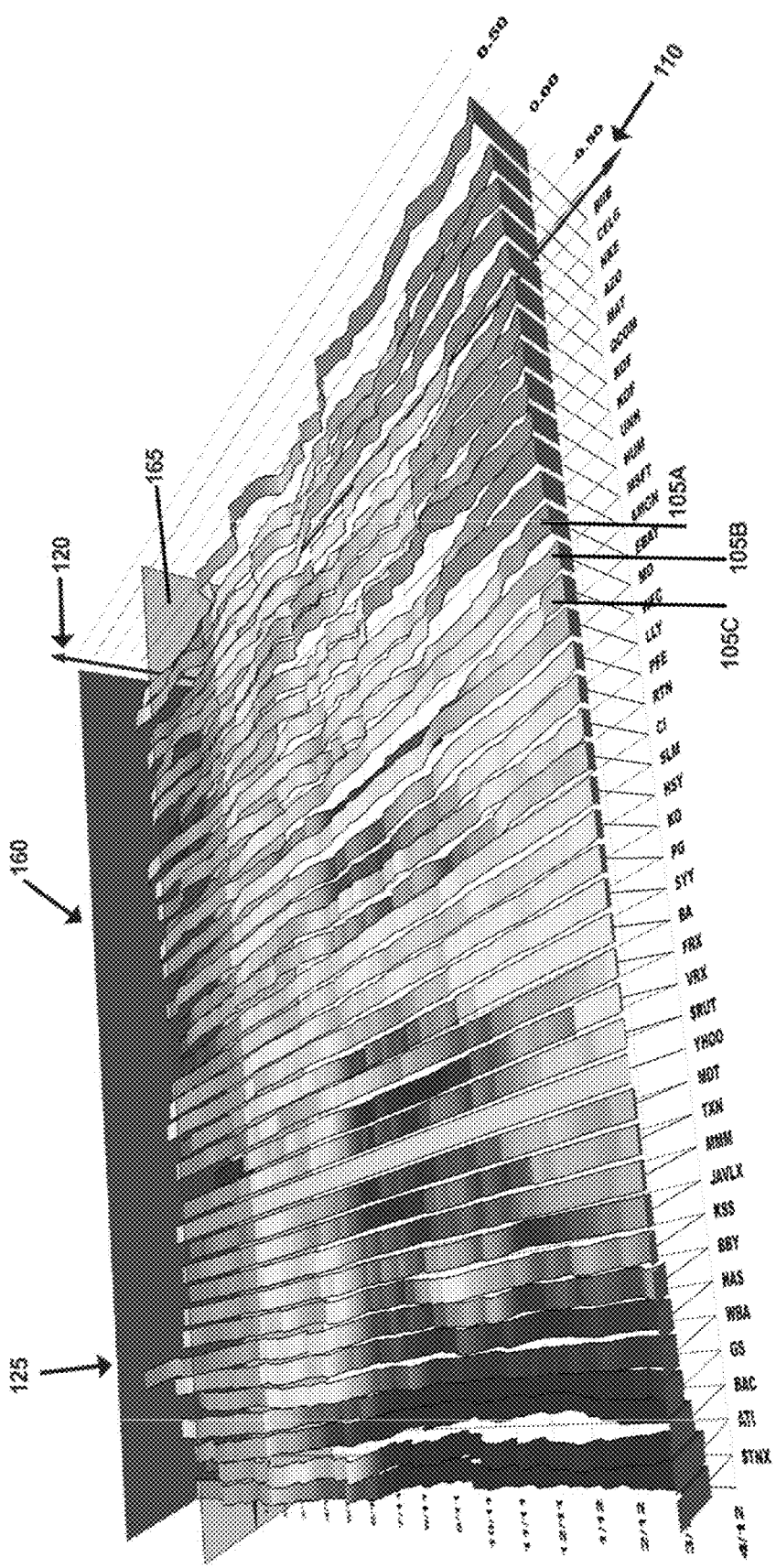
FIG. 6 is a schematic illustration showing a sixth embodiment of the present invention, wherein there is provided a three dimensional orthogonal chart system for visualizing data comprising a plurality of data sets, wherein each of the data sets is represented as a separate ribbon propagating along a first axis, with the separate ribbons being displaced from one another along another axis, and further wherein a moving cursor plane is configured for movement along the first axis.

Looking next at FIG. 6, in another preferred form of the invention, there is provided a three dimensional orthogonal chart system 160 for visualizing data comprising a plurality of data sets, wherein each of the data sets is represented as a separate ribbon 105A, 105B, 105C, etc. propagating along the first (X) axis 110, with the separate ribbons 105A, 105B, 105C, etc. being displaced from one another along the third (Z) axis 125, and a moving cursor plane 165 being configured for movement along the first (X) axis 110. Each ribbon 105A, 105B, 105C, etc. preferably varies in height along the second (Y) axis 120, while having a substantially fixed width as measured along the third (Z) axis 125. The moving cursor plane 165 preferably extends parallel to the second and third axes 120 and 125. If desired, ribbon 105A, 105B, 105C, etc. can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 160 is utilized to chart stock transactions, with date being represented along the first (X) axis 110, and with the performance for one stock being plotted along the second (Y) axis 120 by ribbon 105A, the performance for another stock being plotted along the second (Y) axis 120 by ribbon 105B, the performance for still another stock being plotted along the second (Y) axis 120 by ribbon 105C, etc. Again, by way of example but not limitation, performance can be measured in terms of rate of return, value, relative value, relative value over time, etc. With respect to ribbon 105A, 105B, 105C, etc., it may also be shaded according to its variance from norm and its width may be fixed but represent the maximum volume traded.

Seventh Embodiment

Figure 7:
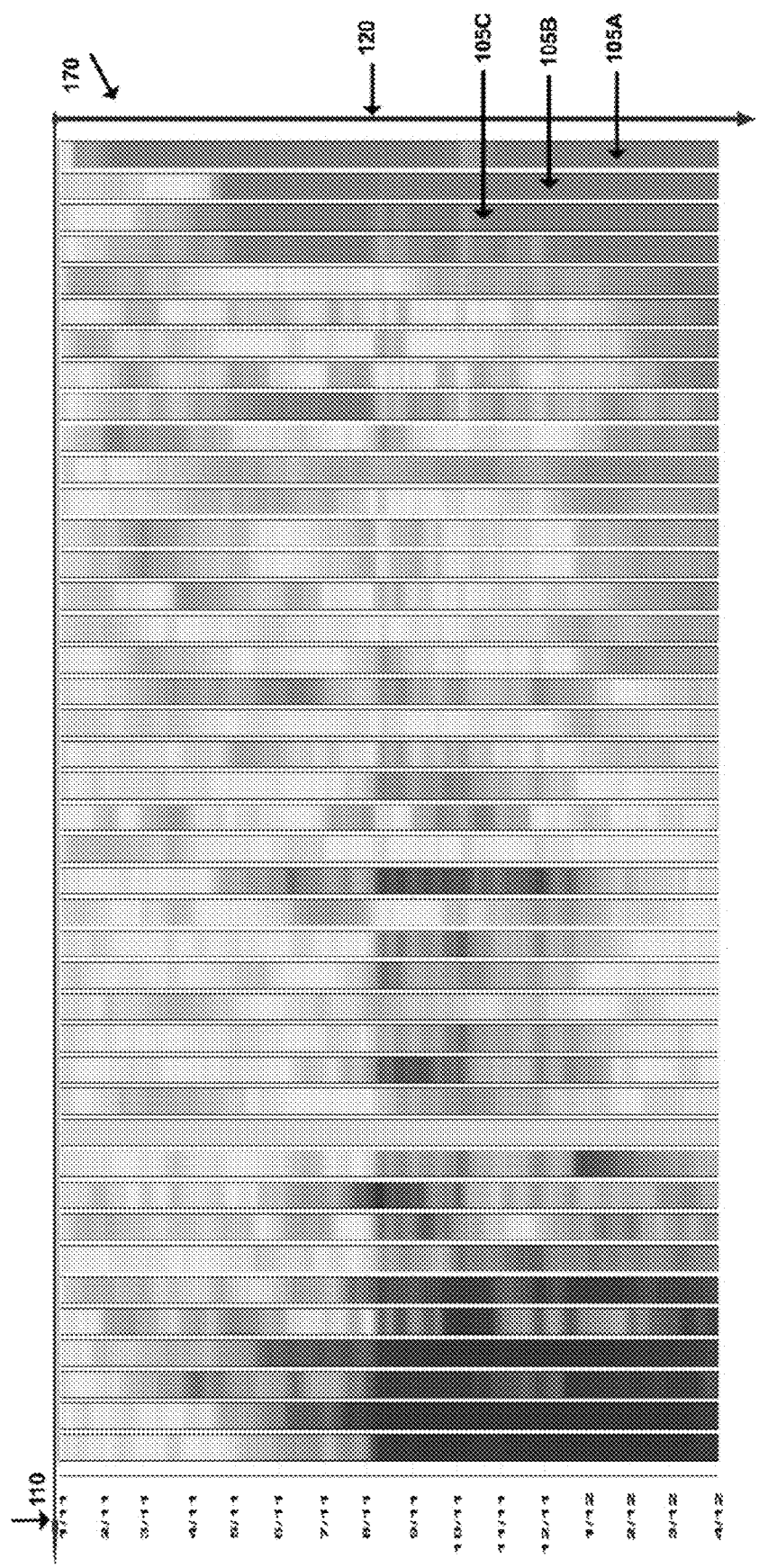
FIG. 7 is a schematic illustration showing a seventh embodiment of the present invention, wherein there is provided a three dimensional orthogonal chart system for visualizing data comprising a plurality of data sets, wherein each of the data sets is represented as a separate ribbon propagating along a first axis, with the separate ribbons being displaced from one another along a second axis, and with the angle of view being an overhead view in an orthographic projection.

Looking next at FIG. 7, in another preferred form of the invention, there is provided a three dimensional orthogonal chart system 170 for visualizing data comprising a plurality of data sets, wherein each of the data sets is represented as a separate ribbon 105A, 105B, 105C, etc. propagating along the first (X) axis 110, with the separate ribbons 105A, 105B, 105C, etc. being displaced from one another along the third (Z) axis 125, and with the angle of view being a overhead view in an orthographic projection. If desired, ribbon 105A, 105B, 105C, etc. can be colored and/or variably shaded and/or of varying opacity and/or of varying material properties (e.g., texture, reflectivity, shininess, etc.) so as to communicate additional information (i.e., data sets). In one particularly preferred form of the invention, three dimensional orthogonal chart system 170 is utilized to chart stock transactions, with date being represented along the first (X) axis 110, and with the performance for one stock being plotted along the second (Y) axis 120 by ribbon 105A, the performance for another stock being plotted along the second (Y) axis 120 by ribbon 105B, the performance for still another stock being plotted along the second (Y) axis 120 by ribbon 105C, etc. Again, by way of example but not limitation, performance can be measured in terms of rate of return, value, relative value, relative value over time, etc. With respect to ribbon 105A, 105B, 105C, etc., it may also be shaded according to its variance from norm and its width may be fixed but represent the maximum volume traded.

Eight Embodiment

Figure 8:
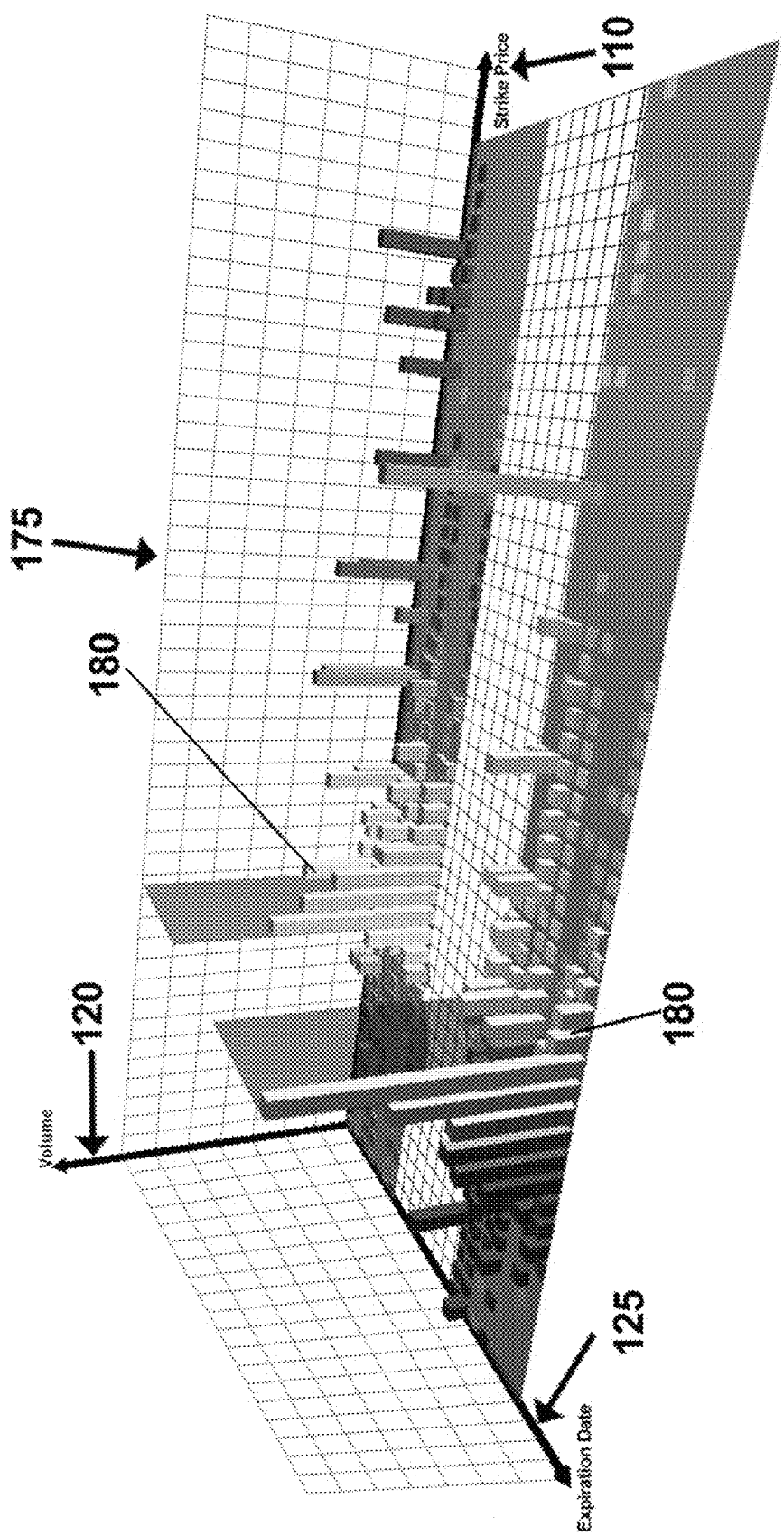
FIG. 8 is a schematic illustration showing an eighth embodiment of the present invention, wherein there is provided a three dimensional orthogonal chart system for visualizing data comprising the pricing, distribution, and trading activity for option contracts, including both calls and puts, with strike price being plotted along the first axis, option price (or some other data set) being plotted along the second axis, and expiration date being plotted along a third axis.

Looking next at FIG. 8, in another preferred form of the invention, there is provided a three dimensional orthogonal chart system 175 for visualizing data comprising the pricing, distribution, and trading activity for option contracts, including both calls and puts. Individual option contracts may be represented by discrete objects 180 placed within the three dimensional chart system, where strike price may be plotted along the first (X) axis 110, volume (or some other data set) may be plotted along the second (Y) axis 120, and expiration date may be plotted along a third (Z) axis 125. Different shapes may represent different data sets, (e.g., calls may be represented by rectangles, puts by cylinders, etc.). Furthermore, color, shading, opacity, etc. may represent additional data sets. By way of example but not limitation, other data sets may comprise implied volatility, historical volatility, intrinsic value, time value, etc. The various axes may comprise discrete and finite elements, e.g., strike price may only occur at selected values.

Implementation

The present invention can be implemented manually (e.g., with a pencil and paper) or, more preferably, it can be implemented with a computer system.

Computer Implementation—Overview.

In a preferred computer implementation, the system is implemented in a software application running on a computer. The computer receives, collects and stores securities data which may be provided by one or more third-party, real-time data feeds, providing that data on both an as-requested and streamed basis to the computer.

Functional Components

The software is preferably divided into four functional components or stages: data receipt and collection, analysis, visualization, and interaction.

Data Collection

At this first stage, securities data is collected from one or more third-party data feed providers and stored. The computer obtains both historical and streamed data. In one preferred form of the invention, the computer can access both premium (i.e., for-payment access) and publicly available sources.

Analysis

In this second stage, a variety of user-selectable analytic methods may be applied to the data set. Existing financial analysis techniques (e.g., moving average, stochastic, etc.) are provided. Statistical elements derived in this stage are also available as data set inputs for the visualization stage. New technologies such as wavelet analysis for noise reduction are preferably also provided.

Visualization

In this third stage, the data sets are rendered in the manner previously described, using computer graphic techniques, so as to generate the aforementioned charts and thereby permit the user to more easily extract meaning from the data sets.

Interaction

In a preferred form of the invention, a sophisticated and intuitive user interface is provided, so as to enable the user to isolate, view, and compare a variety of different data sets. By way of example, the user interface permits the user to assign different data sets to different chart elements (e.g., price to ribbon, volume to curtain, etc.) and permits the user to move chart elements as appropriate (e.g., to move the moving cursor plane 160 shown in FIG. 6).

Applications

The present invention is particularly well suited for application to financial data. However, it will also be appreciated that it may be applied to a wide range of other fields as well, e.g., the analysis of scientific data, network traffic analysis, etc. The present invention is particularly well suited to time series analysis.

MODIFICATIONS

It will, of course, be appreciated that various modifications may be made to the preferred embodiments described above without departing from the scope of the present invention.

Thus, for example, the elements of one embodiment may be combined with elements of another embodiment without departing from the present invention.

By way of example but not limitation, additional visual elements (e.g., additional ribbons, curtains, stacked curtains, back planes, etc.) may be added to any of the charts to represent additional data sets.

Furthermore, the angle of view may be altered or adjusted for any of the charts.

Also, if desired, charts may be generated via a variety of projections, e.g., perspective (as in the majority of the charts discussed above), orthographic, isometric, elevation, etc.

These and other changes of their type are considered to be within the scope of the present invention.

What is claimed is:

1. A computer-implemented method for visualizing data comprising at least three data sets that are accessible to a computing device, comprising:
   causing the computing device to implement in a graphical display device coupled to the computing device a perspective rendering of a plurality of visually distinct ribbons in a three-dimensional orthogonal coordinate system, wherein a first one of the data sets is represented as a ribbon propagating along a first axis, a second one of the data sets is represented as a first curtain that falls from the ribbon so as to extend along a second axis, wherein the ribbon is variable in height along the second axis and variable in width along a third axis, and a third one of the data sets is represented as a stacked curtain that falls from the ribbon so as to extend along the second axis, wherein values of first, second, and third attributes are defined along the first, second, and third axes respectively, wherein the ribbon is separated from another ribbon along the third axis, and, at any location on such ribbon, such ribbon has a height that is uniform across the width of the ribbon.

2. A method according to claim 1 wherein a portion of said ribbon varies in height along the second axis, while having a fixed width as measured along the third axis.

3. A method according to claim 1 wherein said first curtain has a height along the second axis which is the same as the height of said ribbon at that point along the first axis, and a varying displacement along the third axis.

4. A method according to claim 1 wherein said stacked curtain has a substantially constant height along the second axis, and a varying displacement along the third axis.

5. A method according to claim 1 wherein at least one of said ribbon, said first curtain and said restacked curtain is colored or variably shaded or of varying opacity or of varying material properties so as to communicate additional information.

6. A method according to claim 1 wherein the computing device is configured for visualizing data relating to securities transactions, with time being the first attribute and dates being represented along the first axis, with first securities data being the second attribute and the first securities data being plotted along said second axis by said ribbon, and second securities data being the third attribute and the second securities data being plotted along said third axis by said first curtain, and with a third data set being plotted along said third axis by said stacked curtain.

7. A computer-implemented method for visualizing data comprising at least four data sets that are accessible to a computing device, comprising: causing, the computing device to implement in a graphical display device coupled to the computing device a perspective rendering of a plurality of visually distinct graphical objects in, a three-dimensional orthogonal coordinate system wherein one data set is represented as a ribbon propagating along a first axis, the second and third data sets are represented as first and second stacked curtains, respectively, and the fourth data set is represented as a back plane propagating along the first axis, wherein the fourth data set comprises a composite of the second and third data sets, the first stacked curtains falls from the ribbon so as to extend along a second axis, wherein the ribbon is variable in height along the second axis and is variable in width along a third axis, wherein values of first, second, and third attributes are defined along the first, second, and third axes respectively, and wherein, at any location on such ribbon, such ribbon has a height that is uniform across the width of the ribbon.

8. A method according to claim 7 wherein a portion of said ribbon varies in height along a second axis, while having a fixed width as measured along the third axis.

9. A method according to claim 7 wherein said back plane has a constant height along said second axis which is the same as the height of said ribbon at that point along the first axis, and a varying displacement along the third axis.

10. A method according to claim 7 wherein said first and second stacked curtains have a substantially constant height along the second axis, and a varying displacement along the third axis.

11. A method according to claim 7 wherein said fourth data set comprises a composite of said second and third data sets.

12. A method according to claim 7 wherein at least one of said ribbon, said first and second stacked curtains and said back plane are colored or variably shaded or of varying opacity or of varying material properties so as to communicate additional information.

13. A method according to claim 7 wherein the computing device is configured for visualizing data relating to securities transactions, with time being the first attribute and dates being represented along the first axis, with securities data being the second attribute and the securities data being plotted along said second axis by a ribbon, a second data set being plotted along said third axis by said first stacked curtain, and a third data set being plotted along said third axis by said second stacked curtain.

14. A computer-implemented method for visualizing data comprising a plurality of data sets that are accessible to a computing device, comprising: causing the computing device to implement in a graphical display device coupled to the computing device a perspective rendering of a plurality of visually distinct ribbons in a three-dimensional orthogonal coordinate system, wherein each of the data sets is represented as a separate ribbon propagating along a first axis, wherein each ribbon is variable in height along a second axis and is variable in width along a third axis, wherein values of first, second, and third attributes are defined along the first, second, and third axes respectively, and wherein each ribbon is separated from the other ribbons along the third axis, and, at any location on such ribbon, such ribbon has a height that is uniform across the width of the ribbon.

15. A method according to claim 14 wherein a portion of each of said ribbons varies in height along a second axis, while having a fixed width as measured along the third axis.

16. A method according to claim 14 wherein at least one of said ribbons is colored or variably shaded of varying opacity or of varying material properties so as to communicate additional information.

17. A method according to claim 14 wherein the computing device is configured for visualizing data relating to securities transactions, with time being the first attribute and dates being represented along the first axis, and with securities data being the second attribute and the securities data for one security being plotted along said second axis by a first ribbon, the securities data for another security being plotted along said second axis by a second ribbon, the securities data for still another security being plotted along said second axis by a third ribbon.

18. A computer-implemented method for visualizing data comprising a plurality of data sets that are accessible to a computing device, the method comprising:
 causing the computing device to implement in a graphical display coupled to the computing device a perspective rendering of a plurality of visually distinct ribbons in a three-dimensional orthogonal coordinate system, each such ribbon having a pair of opposed sides defining at any location along such ribbon a width thereof,
 wherein:
  each of the data sets is represented as a distinct ribbon propagating along a first axis along which are defined values of a first attribute,
  each ribbon is variable in height along a second axis along which are defined values of a second attribute, and
  each ribbon is separated from the other ribbons along a third axis, and, at any location on such ribbon, such ribbon has a height that is uniform across the width of the ribbon.

19. The method according to claim 18 wherein a each ribbon is variable in width along the third axis along which are defined values of a third attribute.

20. The method according to claim 18 wherein at least one of said ribbons is colored or variably shaded or of varying opacity or of varying material properties so as to communicate additional information.

21. The method according to claim 18 wherein the computing device is configured for visualizing data relating to securities transactions, with time being the first attribute and dates being represented along the first axis, and with securities data being the second attribute and the securities data for a first security being plotted along said second axis by a first one of the ribbons, the securities data for a second security being plotted along said second axis by a second one of the ribbons, the securities data for a third security being plotted along said second axis by a third one of the ribbons.

* * * * *